Aug. 27, 1968   W. D. WHITAKER   3,399,001
CONICAL HYDROSTATIC FLOATING BEARING
Filed Dec. 16, 1966   2 Sheets-Sheet 1

INVENTOR.
WILLIAM D. WHITAKER
BY Edward O. Ansell
William E. Hiller
ATTORNEYS

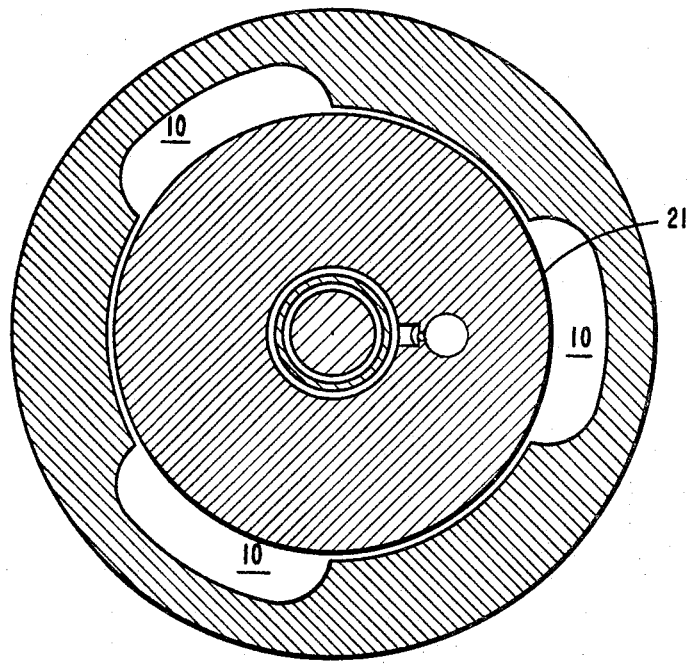
FIG.-3
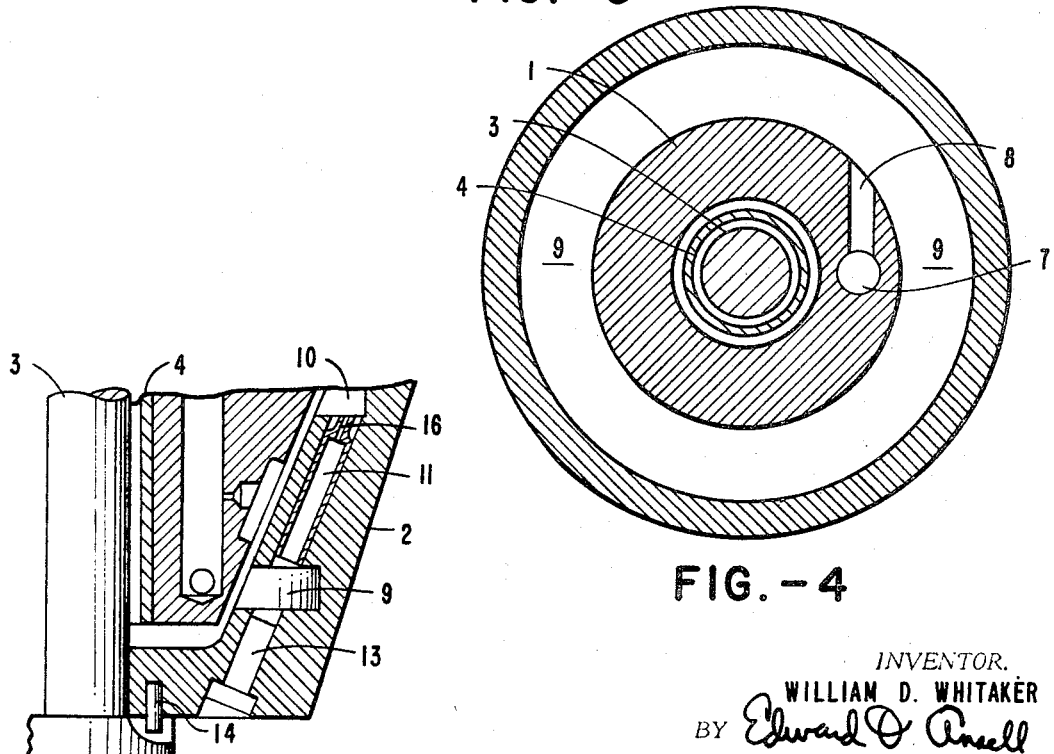
FIG.-4
FIG.-5
INVENTOR.
WILLIAM D. WHITAKER
BY Edward D. Ansell
William E. Hiller
ATTORNEYS

United States Patent Office 3,399,001
Patented Aug. 27, 1968

3,399,001
CONICAL HYDROSTATIC FLOATING BEARING
William D. Whitaker, Los Alamitos, Calif., assignor to Aerojet-General Corporation, El Monte, Calif., a corporation of Ohio
Filed Dec. 16, 1966, Ser. No. 602,366
15 Claims. (Cl. 308—9)

ABSTRACT OF THE DISCLOSURE

The invention disclosed herein relates to hydrostatic bearings conical in nature and interfitted with means for so distributing the fluid medium therethrough that the rotor element floats in the fluid above the stator element and the fluid pressures are adjusted against loading variations so as to support both axial and radial loads to provide reliable long-term, high-speed operation thereof.

The invention described herein was made in the performance of work under a NASA contract and is subject to the provisions of the National Aeronautics and Space Act of 1958, Public Law 85–568 (72 Stat. 426; 42 U.S.C. 2451), as amended.

Brief summary of the invention

This invention relates to fluid bearings for rotating shafts, and more particularly, to a fluid bearing which will support both radial and axial loads during long-term, high-speed operation.

The bearing of this invention may be described as a conical hydrostatic bearing. In the form hereinafter described, the invention uses mercury as the hydrostatic medium. It should be clear that other fluid media may be used in bearings according to the invention.

The bearing according to the invention contemplates a pair of mating cones, the outer one of which is rotatable and the inner one non-rotating. The outer cone is rigidly attached to a rotating shaft or rotor. The inner cone is supported by a fixed structure such as a rotor housing and held rigidly so as to preclude rotation thereof, but provides for a controlled degree of axial motion of the inner cone. The inner cone is forced by resilient means towards the outer cone so that the inner and outer cone surfaces are held relatively close to one another, but without contact.

Lubricant is permitted to flow through a passage in the inner cone toward its smaller diameter end from which the lubricant enters the space between the cones. The lubricant is admitted to the space at a tangential velocity such that it will rotate in the space in the same direction as the outer cone. An annular groove is provided in the smaller diameter end of the outer cone to receive the lubricant.

About the periphery of the larger diameter end of the outer cone are cut a plurality of recesses equidistantly spaced thereabout. A corresponding plurality of passages are provided in the body of the outer cone each respectively in communication between the annular groove and a respective one of said recesses. Each of the passages has a constrictive means to control the lubricant flow to the corresponding recess from the annular groove. The inner cone is provided with a plurality of separate recesses equidistantly spaced about the periphery of the bearing surface and located opposite the unrecessed portion of the surface of the outer cone. Each of the recesses in the inner cone has an orifice by which it is in communication with the annular groove of the outer cone.

As the clearance between the proximate inner and outer cone surfaces in the vicinity of a recess varies, the pressure in the recess varies resulting in an increase in the separating force as the clearance between the cone surfaces decreases.

The particular novelty of the new bearing lies in the conical shape which makes it possible to support both radial and axial loads and at the same time use transfer passages in the outer cone body as a centrifugal pump. As the speed of the shaft or rotor increases, the pumping action in the transfer passages creates an increased pressure of lubricating fluid entering the orifices leading to the outer recesses. The increase in pressure results in an increase in the load carrying capacity of the bearing. The bearing is therefore easily capable of high speed operation under increasing load conditions.

When mercury is the fluid medium in the bearing, the operation creates a scavenging action on the liquid mercury thereby maintaining a mercury vapor environment about an adjacent rotor.

It is accordingly a principal object of this invention to provide a novel fluid bearing which supports both radial and axial loads.

It is another object of the invention to provide a fluid lubricated bearing which is stable and which is particularly suited to long-term, high-speed operation.

A further object of the invention is to provide a bearing which scavenges liquid mercury and in so doing maintains a mercury vapor environment about an adjacent rotor.

Still another object is to provide a bearing having sufficiently large passages to accommodate a relatively dense lubricant film and to reduce bearing wear and friction losses.

A still further object of the invention is to provide a conical hydrostatic bearing that avoids the problems of boundary lubrication and the detrimental effects of distortion and erosion encountered in prior art bearings under long term operating conditions.

And it is yet another object of the invention to provide a conical hydrostatic bearing with liquid mercury as the lubricant.

These and other objects and advantages of this invention will become apparent from the following description of the drawings in which:

Description of figures

FIGURE 3 is a section through 3—3 of the bearing shown in FIGURE 1;

FIGURE 4 is a section through 4—4 of the bearing shown in FIGURE 1; and

FIGURE 5 is a cross-sectional detail showing a further embodiment of the invention including a vibration damper.

Detailed description

Figures 1, 2:
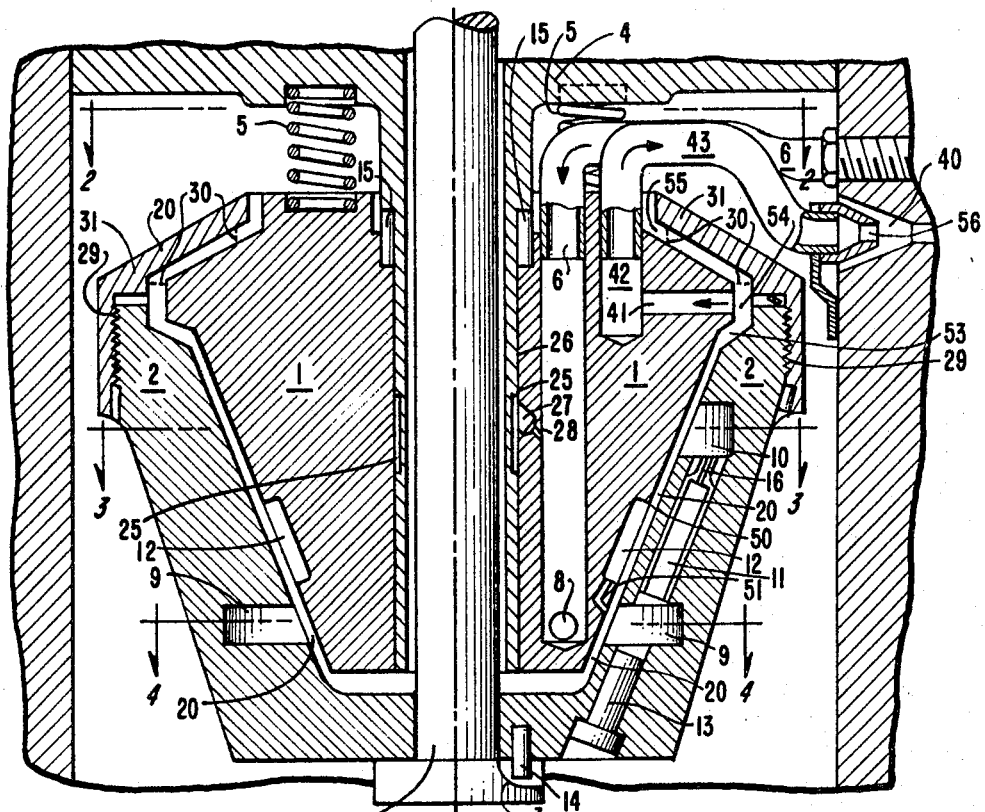
FIGURE 1 is a cross sectional view through a conical bearing according to the invention.
FIGURE 2 is a partial section through the bearing housing according to the invention along the line 2—2 shown in FIGURE 1.

Referring now to FIGURE 1, the bearing of this invention can be seen to include a pair of mating cones, 1, 2, the outer (rotor) cone 2 being rotatable and the inner (stator) cone 1, being non-rotatable. Outer cone 2 is rigidly attached to a rotatable shaft or rotor 3 by a flange pin 14 which may be seen in FIGURE 1 through the cutaway portion of 3a of shaft 3. The inner cone 1 is so supported by a fixed rotor housing structure 4 as to prevent the inner cone 1 from rotating while at the same time providing for a controlled amount of axial motion thereof. The controlled axial movement is limited by guide pin 15 and the crown 31 of outer cone 2. Spring 5 or other suitable means force inner cone 1 axially toward outer cone 2 to keep the respective conical surfaces in relatively close proximity. Lubricating fluid is supplied under pressure to the body of the inner cone 1 through a flexible tube 6 or other suitable means. The lubricant flows from tube 6 through a passage 7 in the body of the inner cone 1 toward the smaller diameter end of cone 1. At the smaller diameter end, the lubricant is transmitted to the space between the cones through a radial passage 8. The passage 8 is so located as to eject lubricant into the space 20 between the cones with a velocity having a tangential component so that the lubricant rotates in the same direction as the outer cone 2. An annular recess 9 is provided in the outer cone 2 at the smaller diameter end to receive the lubricant. This recess 9 is shown in more detail in FIGURE 4. The outer cone 2 is also provided with at least three separate recesses 10 seen in detail in FIGURE 3 equally spaced circumferentially around the bearing surface near the larger diameter end of cone 2. Each recess 10 is located opposite an uninterrupted annular surface such as 2, of the inner cone 1. Passages 11 in the body of the outer cone 2 (one per recess 10) provide for flow of lubricant from the annular recess 9 to each recess 10. Each passage 11 has an orifice or other suitable restriction 16 at the remote end from passage 9 to control the flow to its corresponding recess 10. The inner cone 1 is provided with at least three separate recesses 12 equally spaced circumferentially around the bearing surface, the recesses 12 being located opposite the uninterrupted annular surface of the outer cone 2 between the annular recess 9 and the recesses 10 of the outer cone 2. Each inner cone recess 12 has an orifice 22 by which it communicates with the annular recess 9 across the space between the inner cone 1 and outer cone 2.

Passages 11 are closed with plugs 13 or other suitable means to prevent leakage of lubricant from the bearing. All recesses and passages of the bearing are filled with fluid. The bearing components function as a hydrostatic bearing in a manner well known in this art. As the clearance between the bearing surfaces in the vicinity of a recess such as 10 varies, the pressure in recess 10 varies so that the separating force increases as the clearance decreases. Herein lies the novelty of this bearing. The conical configuration of the bearing makes it possible to support both radial and axial loads. The transfer passages 11 in the body of outer cone 2 are used as a centrifugal pump. As the speed of shaft or rotor 3 increases, the pumping action in the transfer passages 11 increases the pressure of the lubricating fluid entering the orifices 16 leading to the recesses 10. As this fluid pressure through orifices 16 increases the load carrying ability of the bearing increases. In the section with the top removed in FIGURE 2, the structure of the bearing is viewed from above. In FIGURE 1 there is shown also a vibration damping device to stabilize the bearing. The fixed structure 4 is provided with at least three separate recesses 25 equally spaced circumferentially around the fixed structure 4 and adjacent to the inner bearing surface 26 of cone 1. Recesses 27 may also be located on the inner (fixed) cone 1 adjacent to the fixed structure 4. A passage 28 connects each recess 27 with passage 7. If recesses 27 are included, at least two additional passages 7 and 8 are added to fixed cone 1 to coincide with each vibration damper. Each passage 28 is a restricted orifice or other suitable restriction to control the flow to passage 7. As a shock absorber or vibration damper, any sudden lateral shift of cone 1 results in compression of fluid in aperture 25 which bleeds into aperture 27. The pressure increases because of restriction 28 to absorb the shock.

It should be noted that were only the apertures 25 present as vibration dampers the action would be similar but not quite as effective.

The bearing structure of cone 2 is provided with a cover 31 to maintain a mercury vapor environment about the adjacent rotar 2 and cone 1. The cover 31 of cone 2 is extended to cover the inner cone 1. The fluid contained between the inner cone 1 and outer cone 2 is centirfugally pumped toward the larger diameter of the cones by the rotation of the outer cone 2. To increase this pumping action, ribs may be fixed to the surface of the outer cone 2 opposite the inner cone 1. The pumping action establishes a pressure gradient wherein the highest pressure of fluid is located at the larger diameter point between the cones. With sufficient pumping action and pressure gradient an interface 30 between liquid and vapor or gas will be located between the inner cone 1 and outer cone 2 and the highest pressure point and the outlet to the environment external of the bearing, which environment is bounded by the fixed structure 4, the bearing and an adjacent rotor.

The structure of the outer cone 2 comprises two sections 2 and 31 joined as shown at 29 at the larger diameter. Fabrication of the bearing is made easier by construction of the outer cone in two sections. The main outer cone 2 with the recesses and passages 9, 10, 11 etc. is attached at one end to the shaft or rotor 3 as described above. To change the bearing environment to vapor or gas, an extension to outer cone 31 is connected to the free end of the main outer cone 2. One method of connection is to provide threads 29 for attachment of the extension outer cone 31 to main outer cone 2.

The structure of FIGURE 4 is adapted to maintain a vapor environment around the bearing and adjacent to the rotor 3. An annular passage 41 extends radially inward through the body of the inner cone 1 from the highest pressure point 54 connecting the separation between the inner cone 1 and outer cone 2 and axial passage 42. Passage 42 connects annular passage 41 with flexible tube 43 which in turn connects passage 42 with a jet pump 40. The jet pump evacuates fluid from the bearing through passages 41 and 42 and flexible tube 43. The jet pump 40 also scavenges the vapor environment of the bearing, maintaining pressure in the environment so the vapor will ont condense.

The over-all operation of the invention can best be understood with reference to FIGURE 1 wherein it will be assumed stator 1 is receiving fluid via tubing 6 entering passage 7 and being ejected via exit port 8 into space 20 and annular groove 9 in rotor 2, and that rotor 2 is rotating rapidly, say, at 20,000 r.p.m. the space 20 is about .004 inch.

The injection pressure of fluid into passage 7 may be at 50 p.s.i.a. This fluid is ejected into the space 20 between rotor 1 and stator 2 at about 20 p.s.i.a. Thus, in recesses or pockets 12 the pressure may be 20 p.s.i.a. at the junction points 50, 51 with the conical space 20. The centrifugal action due to rotation of rotor 2 builds up pressure so that at the maximum diameter area 53 of the conical space 20 the radial fluid pressure may be as much as 296 p.s.i.a., whereas at the extreme periphery 54 of the conical space 20 the radial pressure will have reached a value of 466 p.s.i.a., as it enters annular exit passage 41. Vapor forms in the space 30—30 reducing to a pressure of 1 p.s.i.a. at the edge 55 of the space 30—30. The pressure at outlet 40 is about 350 p.s.i.a. The area of outlet 56 is set to permit flow.

When a loading condition results in a pressure shift, fluid flows from annular space 9 through passages 11 and orifices 16 to recesses 10. The pressure at orifices 16 is at a level of 1020 or more p.s.i.a. while in recesses 10 it is 500 or more p.s.i.a. due to the centrifugal build up. The changing loads result in either more or less pressures in 16 or 10 as required to compensate for the load changes. The compensating path 9–11–16–10 usually is operative for the condition of load increase where more pressure is pumped up for compensation. As previously described, the separating force increases as the space 20 narrows at any point in the rotation of rotor 2 about stator 1.

Summary

There has been described hereinabove a fluid (hydrostatic) bearing of conical shape principally intended for operation with a mercury lubricant for high speed rotation. Because of the structure including an array of interconnecting passages the rotation results in the creation of a pressure gradient by which the fluid lubricant enters the interface between the stator and rotor 2 tangentially near the smallest conical diameter and is carried up to the widest diameter where it develops into a vapor. It is scavenged by being pumped out and returned.

The novel bearing by its shape and its various chambers and orifices hereinabove described provides means whereby as the load upon the bearing increases, the pressure of the vapor increases to counteract the load so that the bearing surfaces at no time come in contact. The higher the speed of rotation, the more pressure is available to counteract either axial or radial loading effects. The stator is nominally fixed. However, springs 5 permit a degree of axial movement during any corrective phases of operation under load to further assist in the maintenance of free rotation under high speeds and heavy loading.

What is claimed as new is:

1. A hydrostatic bearing comprising in combination:
   a housing;
   a first conical bearing member relatively fixed within said housing and being attached to said housing by axially aligned resilient means permitting limited axial movement of said first conical bearing member within said housing;
   a shaft disposed rotatably and centrally in said housing passing through said first bearing member;
   a second conical bearing member attached to said shaft and being configured oppositely from said first bearing member to mate with and to be rotatable freely about said first bearing member on said shaft within said housing, there being a space between said first and said second conical bearing members;
   said first conical bearing member having an inlet means disposed axially therethrough coupled to an external source of fluid near the widest diameter thereof and having a tangential exit passage near the narrowest diameter thereof, said exit passage opening into said space between said first and second bearings, and there being a plurality of uniformly spaced pockets disposed in the conical surface of said first bearing member with a smaller passage from each extending to a point lower down on said bearing;
   said second bearing member having an annular groove disposed in the surface thereof opposite the exit line of said exit passage in said first bearing member, and said second bearing member also having a plurality of uniformly spaced recesses positioned above said annular groove, and having a communicating passage between each of said recesses, respectively, and said annular groove, each of said respective communicating passages having a restriction near the recess of smaller cross section than said communicating passage; and
   said first bearing member having an annular groove disposed about the upper and widest periphery thereof and an axis passage communicating therewith said passage extending upwardly and having a tube coupled therewith to an external pump;
   whereby when said second bearing is rotated on said shaft about said first bearing member, fluid injected into said first bearing member from said external source is dispensed into the space between said first and second bearing members and into said annular groove of said second bearing member through said tangential exit port, the rotation causing said fluid to rise centrifugally to the widest diameter of said space, the pressure increasing by virtue of the expanding velocity at the wider diameter and entering said annular grooves in said first bearing member to be drawn out through said tube to said external pump, and when a load pressure variation occurs the difference in pressure between said annular groove in said second bearing member and the respective recesses therein results in the transmission of fluid through said communicating passages to said recesses to increase pressure in said space between said first and second bearing members sufficient to compensate for said load pressure variation.

2. In combination,
   a housing,
   a shaft extending within said housing; and
   a hydrostatic bearing supporting said shaft for rotation within said housing, said hydrostatic bearing comprising:
   a first conical bearing member carried by said housing in spaced relation to said shaft,
   said first bearing member being provided with an inlet passage means extending axially therein,
   resilient means supporting said first bearing member within said housing for limited axial movement with respect to said housing,
   said supporting means including an axially extending sleeve disposed in radially outwardly spaced relation to said shaft,
   said first bearing member being attached to said sleeve,
   a second conical bearing member carried by said shaft for rotation therewith and disposed in spaced overlying relation to said first conical bearing member,
   said first and second bearing members having opposed elongated conical bearing surfaces,
   said first bearing member having a plurality of pockets uniformly spaced on the circumference of and opening into the conical bearing surface thereof adjacent the smaller diameter end of said conical bearing;
   said first bearing member having a plurality of ports extending between each of said pockets therein and the conical bearing surface thereof,
   each of said ports having a transverse cross-sectional area materially less than the cross-sectional area of the pocket in said first bearing member corresponding thereto and opening into the conical bearing surface thereof,
   said first bearing member having a passage means extending between said inlet passage means formed therein and the conical bearing surface thereof, and means connected to said inlet passage means of said first bearing member for admitting liquids into said bearing.

3. A hydrostatic bearing as defined in claim 2 in which said sleeve upon which said first bearing member is mounted is provided with
   a plurality of outwardly opening cavities arranged in circumferentially spaced relationship,
   said first bearing member being provided with a plurality of connecting passageways extending between said inlet passage means and respective cavities formed in said sleeve,
   each of said connecting passageways including a portion of restricted diameter extending from said inlet passage means and a portion of enlarged diameter opening into the cavity in said sleeve corresponding to said connecting passageway.

4. A hydrostatic bearing as defined in claim 2 in which said second bearing member is provided with a plurality of circumferentially spaced pockets opening into the conical bearing surface thereof adjacent the end thereof of larger diameter.

5. A hydrostatic bearing as defined in claim 2 in which said second bearing member has an annular groove provided therein, said annular groove opening into the conical bearing surface thereof and disposed adjacent to the end thereof or smaller diameter,
   said annular groove in said second bearing member being axially offset with respect to said pockets in said first bearing member, each of said ports within said first bearing member opening into the conical bearing surface thereof at a point opposite from said annular groove in said second bearing member, said passage means within said first bearing member having a passage means extending between said inlet passage means formed therein and the conical bearing surface thereof at a point opposite from said annular groove in said second bearing member.

6. A hydrostatic bearing as defined in claim 2 with said first bearing member being provided with an outlet passage means extending axially therein, said first bearing member being provided with a plurality of connecting passageways extending radially inward from the conical bearing surface thereof at the larger diameter end to said outlet passage means, jet-pump means connected to said outlet passage means of said first bearing member for evacuating liquids therefrom, means mounted on said housing for maintaining a gaseous environment within said housing and surrounding said hydrostatic bearing.

7. A hydrostatic bearing as defined in claim 2 with means axially biasing said first bearing member in a direction moving the conical bearing surface thereof toward the opposed conical bearing surface of said second bearing member.

8. A hydrostatic bearing as defined in claim 4 in which said sleeve upon which said first bearing member is mounted is provided with a plurality of outwardly opening cavities arranged in circumfrenetially spaced relationship, said first bearing member being provided with a plurality of connecting passageways extending between said inlet passage means and respective cavities formed in said sleeve, each of said connecting passageways including a portion of restricted diameter extending from said inlet passage means and a portion of enlarged diameter opening into the cavity in said sleeve corresponding to said connecting passageway.

9. A hydrostatic bearing as defined in claim 5 with said second bearing member being provided with a plurality of circumferentially spaced pockets opening into the conical bearing surface thereof adjacent the end thereof or larger diameter, said second bearing member also having a series of passages respectively connecting each of the pockets formed therein with said annular groove, each of said passages having a restricted portion intermediate the ends thereof.

10. A hydrostatic bearing as defined in claim 9 with said sleeve upon which said first bearing member is mounted is provided with a plurality of outwardly opening cavities arranged in circumferentially spaced relationship, said first bearing member being provided with a plurality of connecting passageways extending between said inlet passage means and respective cavities formed in said sleeve, each of said connecting passageways including a portion of restricted diameter extending from said inlet passage means and a portion of enlarged diameter opening into the cavity in said sleeve corresponding to said connecting passageway.

11. A hydrostatic bearing as defined in claim 9 with said first bearing member being provided with an outlet passage means extending axially therein, said first bearing member being provided with a plurality of connecting passageways extending radially inward from the conical bearing surface thereof at the larger diameter end to said outlet passage means, jet-pump means connected to said outlet passage means of said first bearing member for evacuating liquids therefrom, means mounted on said housing for maintaining a gaseous environment within said housing and surrounding said hydrostatic bearing.

12. A hydrostatic bearing as defined in claim 11 in which said sleeve upon which said first bearing member is mounted is provided with a plurality of outwardly opening cavities arranged in circumferentially spaced relationships, said first bearing member being provided with a plurality of connecting passageways extending between said inlet passage means and respective cavities formed in said sleeve, each of said connecting passageways including a portion of restricted diameter extending from said inlet passage means and a portion of enlarged diameter opening into the cavity in said sleeve corresponding to said connecting passageway.

13. A hydrostatic bearing as defined in claim 11 with means axially biasing said first bearing member in a direction moving the conical bearing surface thereof toward the opposed conical bearing surface of said second bearing member.

14. A hydrostatic bearing as defined in claim 12 with means axially biasing said first bearing member in a direction moving the conical bearing surface thereof toward the opposed conical bearing surface of said second bearing member.

15. A hydrostatic bearing assembly comprising:

housing means;

a shaft rotatably disposed in said housing means;

a conical stator supporting guide structure for said shaft resiliently disposed in said housing permitting limited axial movement thereof but no radial movement thereof;

a conical rotor attached to said shaft and configured to mate with said stator and move freely about and spaced from said stator;

means in said stator for ejecting fluid into the conical space between said conical stator and conical rotor at the smallest diameter thereof so that as said rotor rotates about said stator the fluid is centrifugally spun outward to the wider diameter creating an increased pressure at said wider diameter of said space;

there being further means in said stator at the widest diameter thereof to receive said fluid at said higher pressure and pump said fluid to the outside of said housing; and said rotor including means for sensing a difference in pressure resulting from changing loads and means coupled therewith for injecting or withdrawing fluid to correct the fluid pressure in said space to compensate for said load changes.

References Cited

UNITED STATES PATENTS 2,822,223   2/1958   Offen.

MARTIN P. SCHWADRON, *Primary Examiner.*

FRANK SUSKO, *Assistant Examiner.*